United States Patent [19]

Kunkle et al.

[11] Patent Number: 4,564,379
[45] Date of Patent: Jan. 14, 1986

[54] METHOD FOR ABLATING LIQUEFACTION OF MATERIALS

[75] Inventors: Gerald E. Kunkle, New Kensington; Joseph M. Matesa, Plum Boro, both of Pa.

[73] Assignee: PPG Industries, Inc., Pittsburgh, Pa.

[21] Appl. No.: 616,103

[22] Filed: Jun. 1, 1984

Related U.S. Application Data

[63] Continuation-in-part of Ser. No. 481,970, Apr. 4, 1983, abandoned, which is a continuation-in-part of Ser. No. 288,581, Jul. 30, 1981, Pat. No. 4,381,934.

[51] Int. Cl.$^4$ .............................................. C03B 3/00
[52] U.S. Cl. ........................................ 65/135; 65/134; 65/335; 266/213; 432/264
[58] Field of Search ................. 65/135, 136, 134, 335, 65/337; 266/213; 432/264

[56] References Cited

U.S. PATENT DOCUMENTS

| | | |
|---|---|---|
| 296,227 | 4/1984 | Schulze-Berge . |
| 682,365 | 9/1901 | Mount . |
| 698,766 | 4/1902 | Voelker . |
| 708,309 | 9/1902 | Bronn . |
| 908,151 | 12/1908 | Schwenzfeier . |
| 1,082,195 | 12/1913 | Helfenstein . |
| 1,371,084 | 3/1921 | Ferguson . |
| 1,577,602 | 3/1926 | Amsler . |
| 1,621,446 | 3/1927 | Watson . |
| 1,863,708 | 6/1932 | Zotos .............................. 65/134 X |
| 1,870,636 | 8/1932 | McIntyre et al. . |
| 1,877,714 | 9/1932 | Bulask . |
| 1,889,509 | 11/1932 | Amsler . |
| 1,889,511 | 11/1932 | Amsler . |
| 1,928,598 | 9/1933 | Morton et al. . |
| 1,953,023 | 3/1934 | Mulholland . |
| 1,999,761 | 4/1935 | Howard . |
| 1,999,762 | 4/1935 | Howard . |
| 2,006,947 | 7/1935 | Ferguson . |
| 2,007,755 | 7/1935 | Ferguson . |
| 2,074,819 | 3/1937 | Weitzenkorn . |
| 2,154,737 | 4/1939 | Erdmann . |
| 2,262,070 | 11/1941 | Turk . |
| 2,358,903 | 9/1944 | Zotos . |
| 2,398,952 | 4/1946 | Nachod . |
| 2,451,582 | 10/1948 | Smith . |
| 2,455,907 | 12/1948 | Slayter . |

(List continued on next page.)

FOREIGN PATENT DOCUMENTS

| | | |
|---|---|---|
| 400472 | 2/1932 | United Kingdom . |
| 964819 | 7/1964 | United Kingdom . |
| 1581672 | 12/1980 | United Kingdom . |

OTHER PUBLICATIONS

Grosse, A., et al., "The Centrifugal Plasma Jet Furnace," Material Research and Standards, Apr. 1965, pp. 173-177.

Whyman, D., "A Rotating-Wall, D.C.-Arc Plasma Furnace," J. Sci. Instrum., 1967, vol. 44, pp. 525-530.

Selton, B. et al., "The Centrifugal Liquid Wall Furnace," J. Materials Science, vol. 4, (1969) pp. 302-309.

Foex, M., et al., "A Plasma Transferred-Arc Heated High-Temperature Rotary Furnace," Fifth Symposium on Special Ceramics, Stoke-on-Trent, G.B., 1970, pp. 175-183.

Foex, M. et al., "High Temperature Rotary Furnace for Melting Refractory Materials Heated Along Central Axis by Plasma Torches," International Conference on Gas Discharges, London, 1970, pp. 241-245.

Everest, D. et al., "Preparation of Ultrafine Alumina Powders by Plasma Evaporation," J. Materials Science, vol. 6 (1971) pp. 218-224.

Yerouchalmi, D., "Four Rotatif A Plasma," Electrotherm Company, Brussels, (date unknown).

Primary Examiner—Arthur Kellogg
Attorney, Agent, or Firm—Dennis G. Millman

[57] ABSTRACT

Converting thermally meltable materials to a liquefied state is carried out on a lining of pulverulent material. As liquefied material is drained from the surface, additional unmelted material is fed onto the surface to maintain the lining substantially intact.

16 Claims, 9 Drawing Figures

U.S. PATENT DOCUMENTS

| | | |
|---|---|---|
| 2,593,197 | 4/1952 | Rough . |
| 2,834,157 | 5/1958 | Bowes . |
| 2,878,004 | 3/1959 | Saeman .................................. 263/32 |
| 3,077,094 | 2/1963 | Jack et al. . |
| 3,109,045 | 10/1963 | Silverman . |
| 3,151,964 | 10/1964 | North ........................................ 65/18 |
| 3,328,149 | 6/1967 | Keefer ..................................... 65/168 |
| 3,510,115 | 5/1970 | Foex et al. ............................. 263/33 |
| 3,510,289 | 5/1970 | Boivent .................................. 65/335 |
| 3,526,492 | 9/1970 | Motsch .................................. 65/335 |
| 3,637,365 | 1/1972 | Oulton ................................... 65/134 |
| 3,689,679 | 9/1972 | Niwa et al. ........................ 65/347 X |
| 3,819,350 | 6/1974 | Pellett et al. ........................... 65/134 |
| 3,917,479 | 11/1975 | Sayce et al. ......................... 75/10 R |
| 3,944,713 | 3/1976 | Plumat et al. ..................... 65/134 X |
| 4,013,278 | 3/1977 | O'Donoghue ...................... 266/213 |
| 4,061,487 | 12/1977 | Kiyonaga ............................... 65/135 |
| 4,062,667 | 12/1977 | Hatanaka et al. ...................... 65/135 |
| 4,110,097 | 8/1978 | Chevallier et al. .................... 65/136 |
| 4,113,459 | 9/1978 | Mattmuller ............................ 65/135 |
| 4,138,238 | 2/1979 | Strickland ............................. 65/134 |
| 4,185,984 | 1/1980 | Kiyonaga ............................... 65/135 |
| 4,188,201 | 2/1980 | Jung ...................................... 65/302 |
| 4,217,462 | 8/1980 | Rawles et al. . |

METHOD FOR ABLATING LIQUEFACTION OF MATERIALS

This is a continuation-in-part of U.S. Pat. application Ser. No. 481,970 filed Apr. 4, 1983, now abandoned which is a continuation-in-part of U.S. Pat. application Ser. No. 288,581, filed July 30, 1981 now U.S. Pat. No. 4,381,934 issued May 3, 1983.

BACKGROUND OF THE INVENTION

The present invention relates to converting pulverulent raw materials to a liquefied state as a first step in a melting process. The invention is particularly applicable to melting glass, including flat glass, container glass, fiber glass, and sodium silicate glass. But the invention is applicable to other processes that involve thermally converting a generally flowable, essentially solid state feed material to a molten fluid. These other processes may include metallurgical smelting type operations and fusing of single or multiple component ceramics, metals, or other materials.

Continuous glass melting processes conventionally entail depositing pulverulent batch materials onto a pool of molten glass maintained within a tank type melting furnace and applying thermal energy until the pulverulent materials are melted into the pool of molten glass.

The conventional tank type glass melting furnace possesses a number of deficiencies. A basic deficiency is that several operations, not all of which are compatible with one another, are carried out simultaneously within the same chamber. Thus, the melter chamber of a conventional furnace is expected to liquefy the glass batch, to dissolve grains of the batch, to homogenize the melt, and to refine the glass by freeing it of gaseous inclusions. Because these various operations are taking place simultaneously within the melter, and because different components of the glass batch possess different melting tempratures, it is not surprising that inhomogeneities exist from point to point within the melter.

In order to combat these inhomogeneities, a melting tank conventionally contains a relatively large volume of molten glass so as to provide sufficient residence time for currents in the molten glass to effect some degree of homogenization before the glass is discharged to a forming operation. These recirculating flows in a tank type melter result in inefficient use of thermal energy and maintaining the large volume of molten glass itself presents difficulties, including the need to heat such a large chamber and the need to construct and maintain such a large chamber made of costly and, in some cases, difficult to obtain refractory materials. Moreover, corrosion of the refractories introduces contaminants into the glass and requires rebuilding of the melter in a matter of a few years. Additionally, it is know that some components of the batch such as limestone, tend to melt out earlier than the sand and sink into the melt as globules, whereas higher melting temperature components, such as silica, tend to form a residual unmelted scum on the surface of the melt. This segregation of batch components further aggravates the problem of inhomogeneities.

Recent findings have indicated that a major rate limiting step of the melting process is the rate at which partly melted liquefied batch runs off the batch pile to expose underlying portions of the batch to the heat of the furnace. The conventional practice of floating a layer of batch on a pool of molten glass is not particularly conducive to aiding the runoff rate, due in part to the fact that the batch is partially immersed in the molten glass. It has also been found that radiant energy is considerably more effective at inducing runoff than is convective heat from the pool of molten glass, but in a conventional melter, only one side of the batch is exposed to overhead radiant heat sources. Similarly, conventional overhead radiant heating is inefficient in that only a portion of its radiant energy is directed downwardly towards the material being melted. Not only is considerable energy waste through the superstructure of the furnace, but the resulting thermal degradation of the refractory roof components constitutes a major constraint on the operation of many glass melting furnaces. Furthermore, attempting to heat a relatively deep recirculating mass of glass from above inherently produces thermal inhomogeneities which can carry over into the forming process and affect the quality of the glass products being produced.

Many proposals have been made for overcoming some of the problems of the conventional tank type glass melting furnace, but none has found significant acceptance since each proposal has major difficulties in its implementation. It has been proposed, for example, that glass batch be liquefied on a ramp-like structure down which the liquid would flow into a melting tank (e.g., U.S. Pat. Nos. 296,227; 708,309; 2,593,197; 4,062,667; and 4,110,097). The intense heat and severely corrosive conditions to which such a ramp would be subjected has rendered such an approach impractical since available materials have an unreasonably short life in such an application. In some cases, it is suggested that such a ramp be cooled in order to extend its life, but cooling would extract a substantial amount of heat from the melting process and would diminish the thermal efficiency of the process. Also, the relatively large area of contact between the ramp and each unit volume of glass throughput would be a concern with regard to the amount of contaminants that may be picked up by the glass. Furthermore, in the ramp approach, a transfer from a radiant source to the melting batch materials is in one direction only.

A variation on a ramp type melter is shown in U.S. Pat. No. 2,451,582 where glass batch materials are dispersed in a flame and land on an inclined ramp. As in other such arrangements, the ramp in the patented arrangement would suffer from severe erosion and glass contamination.

The prior art has also suggested melting glass in rotating vessels where the melting material would be spread in a thin layer on the interior surface of the vessel and would, more or less, surround the heat source (e.g., U.S. Pat. Nos. 1,889,509; 1,889,511; 2,006,947; 2,007,755; 4,061,487; and 4,185,984). As in the ramp proposals, the prior art rotary melters possess a severe materials durability problem and an undesirably large surface contact area per unit volume of glass throughput. In those embodiments where the rotating vessel is insulated, the severe conditions at the glass contact surface would indicate a short life for even the most costly refractory materials and a substantial contamination of the glass throughput. In those embodiments where the vessel is cooled on the exterior surface, heat transfer through the vessel would subtract substantial amounts of thermal energy from the melting process, which would adversely affect the efficiency of the process. In a rotary melter arrangement shown in U.S. Pat. No. 2,834,157 coolers are interposed between the melting material and the refractory vessel in order to preserve the refractories, and it is apparent that great thermal losses would be experienced in such an arrangement. In cyclone type melters, as shown in U.S. Pat. Nos. 3,077,094 and 3,510,289, rotary motion is imparted to the glass batch materials by gaseous means as the vessel remains stationary, but the cyclone arrangements possess all the disadvantages of the rotary melters noted above.

Some prior art processes conserve thermal energy and avoid refractory contact by melting from the interior of a mass of glass batch outwardly, including U.S. Pat. Nos. 1,082,195; 1,621,446; 3,109,045; 3,151,964; 3,328,149; and 3,689,679. Each of these proposals requires the use of electric heating and the initial liquefaction of the batch materials depends upon convective or conductive heating through the mass of previously melted glass. This is disadvantageous because radiant heating has been found to be more effective for the initial liquefaction step. Additionally, only the last two patents listed disclose continuous melting processes. In a similar arrangement disclosed in U.S. Pat. No. 3,637,365, one embodiment is disclosed wherein a combustion heat source may be employed to melt a preformed mass of glass batch from the center outwardly, but it, too, is a batchwise process and requires the melting be terminated before the mass of glass batch is melted through.

SUMMARY OF THE INVENTION

In the present invention the initial process of liquefying batch material is isolated from the remainder of the melting process and is carried out in a manner uniquely suited to the needs of the particular step, thereby permitting the liquefaction step to be carried out with considerable economies in energy consumption and equipment size and cost. Central to the invention is the concept of employing glass batch itself as the support surface upon which liquefaction of glass batch takes place. It has been found that a steady state condition may be maintained in a liquefaction chamber by distributing fresh batch onto a previously deposited batch surface at essentially the same rate at which the batch is melting, whereby a substantially stable batch layer will be maintained beneath a transient batch layer, and liquefaction is essentially confined to the transient layer. Thus, the partially melted batch of the transient zone runs off the surface while contacting substantially only a batch surface, thus avoiding contaminating contact with refractories. Because glass batch is a good heat insulator, providing the stable batch layer with sufficient thickness protects any underlying support structure from thermal deterioration. Because the exterior of a furnace can thus be protected thermally, as well as from contact with corrosive molten materials, the materials requirements can be greatly relaxed, even permitting the use of mild steel as a furnace housing. The economies thus achieved in furnace construction can be substantial. Furthermore, because the furnace housing is protected by the insulating effect of the stable batch layer, no cooling of the support surface is required, thereby avoiding extraction of useful heat from the melting process.

The stable batch surface upon which liquefaction is carried out may be sloped in order to expedite runoff of the liquefied batch. The slope may be the natural angle of repose of the glass batch, or the angle may be increased by providing a preformed batch layer or by centrifugal force in a rotating furnace vessel. The runoff surface is preferably free from obstacles to flow so as to permit free drainage of the liquid out of the liquefaction zone into a subsequent zone where additional melting operations may be performed on the liquid. The liquid leaving the liquefaction zone is by no means a completely melted glass, but is a foamy, opaque fluid including unmelted sand grains and the like. However, it has been found that the additional energy required to complete the dissolution and refining of this runoff liquid constitutes a very small portion of the total energy required to melt glass in a conventional tank type melting operation. Thus, the relatively efficient liquefaction process of the present invention replaces a major energy consuming portion of the conventional melting process. Additionally, it has been found that the runoff liquid is surprisingly uniform in temperature and composition, and therefore each increment of the liquid has essentially identical needs for subsequent processing. This minimizes the need for subsequent homogenization and permits precisely tailoring the subsequent process steps to the specific needs for converting the runoff liquid to molten glass finished to the degree required for the product being produced.

Liquefaction of the batch is brought on by melting of the lowest-temperature-melting components of the batch. Thus, the liquid begins to flow out of the liquefaction zone at a temperature considerably below the temperature required for complete melting of glass, thereby advantageously limiting the function of the liquefaction zone to the unit operation of liquefying the batch. Essentially no increment of the liquefied batch is heated in the zone to a temperature substantially above that corresponding to the onset of flowability. As a result, the fluid leaves the zone at a relatively low, uniform temperature, and the cavity temperature within the liquefaction zone also remains relatively low. This has advantages for the construction of the liquefaction chamber and for reducing heat losses therefrom. The ability to accomplish a major step in the melting process without wastefully overheating some increments of the melt also has positive implications for energy conservation and for suppressing volatilization of some relatively volatile components that are sometimes included in the batch (e.g., sulfur and selenium).

In preferred embodiments of the invention, the thermal efficiency of the liquefaction process is further increased by providing a stable batch layer that substantially encircles a radiant heat source. Typically, the batch surface may constitute a surface of revolution (e.g., a cylinder or frustum). In this manner, radiant energy being emitted by the source will impinge directly upon batch being melted over a wide range of angles. Such an arrangement also permits an efficient use of high temperature heat sources, such as oxygen enriched flames, since much of the enhanced heat flux from such a source will productively impinge upon the surrounding batch surface. In the most preferred embodiments, the concept of encircling the heat source is combined with rotating the batch surface so as to increase the angle of repose.

The present invention may also be employed to improve the emissions of a glass melting furnace. Sulfates included in many glass batch formulas are known to contribute significantly to desirable emissions from glass furnaces. A major purpose for including sulfates in a glass batch is to aid the initial liquefaction process in a conventional tank melter. But since the present invention is specifically adapted to liquefying glass batch, it has been found that efficient liquefaction can be achieved without the presence of sulfates in the batch. Thus, the present invention permits omitting sulfates from the batch, thereby eliminating the resultant emissions.

It has also been found that wetting the batch with water as is conventionally done in order to control dusting is not necessary with the present invention. Since vaporizing the water consumes energy in a melter, elimination of the water improves the energy efficiency. Even more significantly, the ability to use dry batch means that preheated batch may be fed to the process. If the batch is preheated by heat recovery from the exhaust gas stream, substantial energy savings can be attained. It is an advantage of the present invention that the process can accommodate preheated, dry, particulate batch, whereas prior art proposals to recover waste heat by preheating batch have usually been tied to the use of agglomerated batch. It has been found generally that the cost of agglomerating batch on a commercial scale virtually negates the potential energy savings.

Liquefying batch in accordance with the present invention is carried out in a relatively compact vessel rather than the conventional tank type melter which contains a pool of molten glass. Reducing the size saves substantial construction costs. Also, by eliminating the need for a large residual pool of glass, product change-overs are facilitated by the present invention.

The invention will be more fully understood in view of the detailed description of several specific embodiments which follows.

THE DRAWINGS

DETAILED DESCRIPTION OF THE EMBODIMENTS

A number of embodiments incorporating the principles of the present invention will be described, but it should be understod that the practice of the invention is not limited to the specific structures disclosed. Also, since the invention relates to the initial step of liquefying glass batch, the descriptions of the embodiments will be limited to what would be only the initial portion of most glass melting operations. It should be understood that where the product requires, the inventive liquefaction step may be employed in combination with conventional means for further melting, refining, conditioning and forming the glass.

Figure 1:
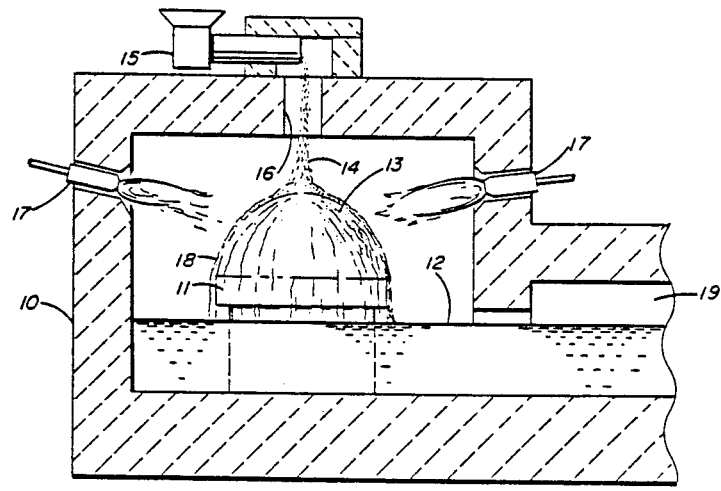
FIG. 1 is a vertical cross-section through a first embodiment of the present invention featuring an elevated batch pile surrounded by heat sources.

FIG. 1 represents a simplified version of the present invention wherein a liquefaction chamber is defined by a refractory brick enclosure 10. A refractory pedestal 11 rises above (or slightly below) the level of a pool of molten glass 12 within the enclosure. A mound of glass batch 13 supported on the pedestal 11 may be either a loose pile of batch or a molded, preshaped mass of batch in the form of a hemisphere, cone, pyramid, tetrahedron or the like. The contour of the batch mound 13 may be maintained substantially stable by continuously replenishing the batch by means of a falling stream of batch 14 fed from a screw feeder 15 or the like through an opening 16 in the roof of the enclosure 10. Heat for melting is provided by radiant energy sources 17 which may be combustion burners as shown in FIG. 1 or any other radiant source such as electric arc heaters. In this embodiment, the radiant energy sources are preferably arranged to provide substantially uniform heat to all sides of the batch mound 13. As the batch liquefies, a fluid layer 18 runs down the surfaces of the batch mound 13 and falls into the pool of glass 12. By controlling the relative amount of heat input and batch being fed in stream 14, a steady state condition may be maintained whereby the batch mound 13 remains substantially stable and the liquefaction is substantially confined to the transient layer 18 and the newly introduced batch stream 14. The partially melted runoff in pool 12 may be passed from the liquefaction chamber to a subsequent chamber 19 for completing the melting of any residual particles and for otherwise processing the glass by methods well known in the art.

Figure 2:
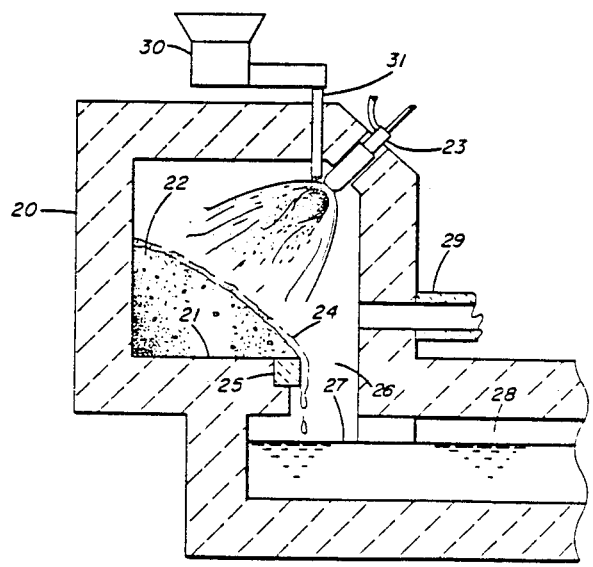
FIG. 2 is a vertical cross-section through a second embodiment of the present invention featuring a sloped batch surface.

In the arrangement shown in FIG. 2, a liquefaction chamber defined by a refractory enclosure 20 includes a shelf portion 21 on which rests a batch mound 22. The batch mound presents a surface sloping downwardly in substantially one direction and facing a radiant heat source such as a burner 23. As shown in the drawing, the batch mound may assume the natural angle of repose of the pulverulent batch material. A layer of liquefied batch 24 runs off the batch mound 22 and over a refractory lip 25 at a bottom exit opening 26 through which the liquid passes from the liquefaction chamber to subsequent processing stations, which may entail a pool of molten liquid 27 in a subsequent chamber 28. Since the batch itself acts as an insulator, the refractory material from which most of the shelf portion 21 of the enclosure is fabricated need not provide exceptional thermal durability, thereby permitting use of economic materials. Only at the small lip area 25, where the batch mound is relatively thin and where the molten material contacts the support refractories, is it advisable to provide a durable refractory material suitable for molten glass contact such as fused quartz or fused cast alumina.

Beneath a layer of batch of about 3 centimeters or more, the thermal durability requirements for the underlying refractory are negligible. As shown in FIG. 2, exhaust combustion gases may escape from the liquefaction chamber by way of a flue 29. Alternatively, the combustion gases may pass through the exit opening 26 and into the downstream chamber 28 so as to expend more of its thermal energy there. In order to maintain a substantially fixed interface between the stable batch mound 22 and the transient liquid layer 24, batch is continuously fed to the melting area. Batch may be distributed over the melting area by any suitable mechanical means or, as shown, the incoming batch may be dispersed by the combustion flame. Batch may be fed by way of a screw conveyor 30 to a ceramic tube 31 extending into the interior of the liquefaction chamber and opening in the vicinity of the burner 23.

Figure 3:
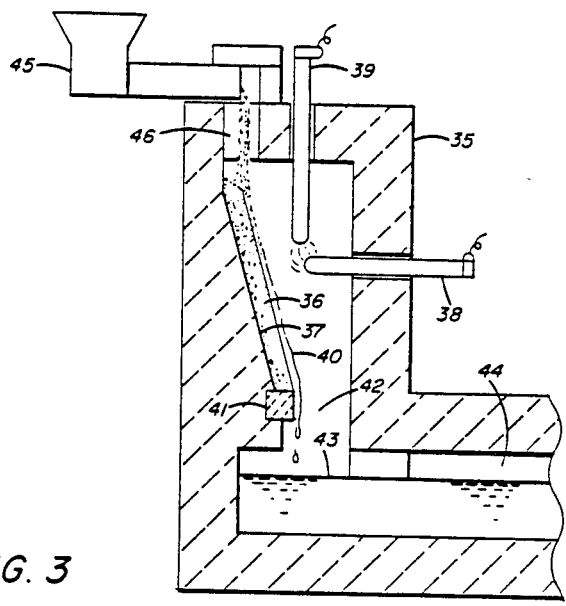
FIG. 3 is a vertical cross-section of a third embodiment of the present invention featuring a compacted, sharply sloping batch surface.

FIG. 3 depicts a variation on the embodiment of FIG. 2. A refractory enclosure 35 defines the liquefaction chamber wherein the batch layer 36 is supported on a steeply sloped surface 37 rather than on a horizontal shelf. The batch layer 36 is provided with a slope sharper than the angle of repose of loose batch by preforming the batch layer into a rigid slab. Glass batch may be preformed by molding batch which has been wetted with water. The batch layer 36 may be retained in place by a refractory lip piece 41 which is preferably a material suitable for molten glass contact of the type described above. An example of a radiant heat source illustrated in FIG. 3 is an electric arc produced by a pair of electrodes 38 and 39 extending into the liquefaction chamber. It should be understood that the liquefaction chamber of either FIG. 2 or FIG. 3 may include a plurality of radiant heat sources so as to permit the melting area to be extended. Loose batch is deposited onto the batch layer 36, becomes liquefied and runs off as a liquid layer 40 which passes through a bottom exit opening 42 from the liquefaction chamber and may be gathered in a molten pool 43 within a chamber 44 for subsequent treatment. The loose batch may be fed by means of a screw feeder 45 to an opening 46 through the top of the liquefaction chamber. The relatively steep slope of the melting surface in the FIG. 3 embodiment may be an advantage for accelerating the runoff of the liquefied batch as well as for simplifying distribution of incoming batch over the melting area. In some cases it may be desirable for the slope to be vertical or nearly vertical.

Figure 4:
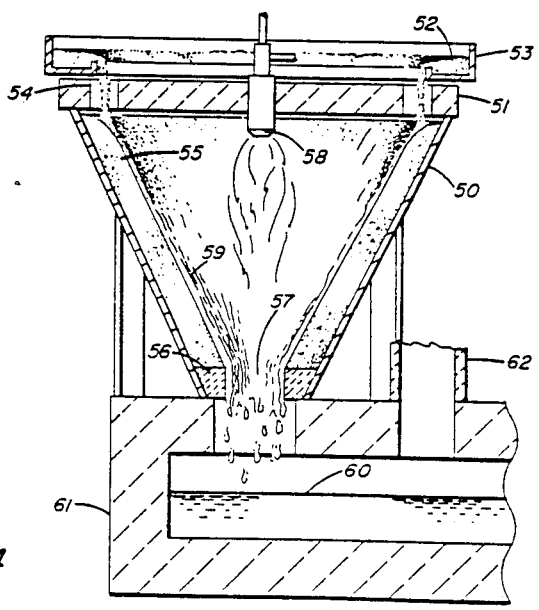
FIG. 4 is a vertical cross-section through a fourth embodiment of the present invention featuring a frustoconical batch surface encircling a heat source.

The embodiment of FIG. 4 has a preferred feature wherein the batch layer encircles the radiant heat source. Such an arrangement advantageously results in a greater portion of the radiant energy productively impinging upon the batch material and permits greater utilization of the insulative effect of the batch layer. Because the heat source is encircled by the insulating batch layer, refractory materials need not be employed for the sidewalls of the housing in the FIG. 4 embodiment. Thus, the housing may comprise a steel vessel 50 which may be provided with a frustoconical shape as illustrated, which may be generally parallel to the interior surface of the batch layer. However, the sloped surface of the batch layer need not correspond to the shape of the housing, and the housing may take any form such as a cylindrical or box shape. A cover 51 of ceramic refractory material may be provided to enclose the upper end of the liquefaction vessel. Batch 52 may be fed from a ring-type vibratory feeder 53 through an annular opening 54 in the cover 51 so that the batch enters the upper end of the vessel substantially evenly distributed around its upper periphery. A sloping, stable batch layer 55 lines the sides of the interior of the liquefaction vessel and may be comprised of loose batch or a preformed, molded lining. As shown in the drawing, the surface of the batch layer facing the heat source is preferably a surface of rotation, in this case a frusto-conical shape parallel to the shape of the housing 50. Paraboloid and cylindrical surfaces may also be employed. However, it should be understood that while surfaces of revolution are preferred for the shape of the batch layer for the sake of receiving uniform heat from a central heat source, other non-revolutionary shapes may be employed, such as inverted pyramidal or tetrahedral shapes. It may be also noted that the batch layer need not be of uniform thickness as long as the minimum thickness is sufficient to provide the desired degree of insulation. Because of the excellent insulating properties of glass batch, a stable batch layer whose minimum thickness is on the order of about 3 centimeters to 5 centimeters, has been found more than adequate to protect a steel housing from undue thermal deterioration. A refractory ceramic bushing 56 at the bottom of the liquefaction chamber helps to retain the batch layer 55 in place, and a central opening 57 in the bushing defines an exit opening from the liquefaction chamber. A source of radiant energy, such as a burner 58 provides heat within the liquefaction zone for melting the batch being fed into the chamber which forms the transient layer 59. The transient layer 59 becomes fluid and flows downwardly through the exit opening 57. The liquefied batch may be captured in a pool 60 contained by a chamber 61 for subsequent processing. Combustion gases from the liquefaction zone may also pass through the opening 57, whereupon they may be discharged from the chamber 61 through a flue 62. Alternatively, an exhaust opening may be provided through the cover 51. FIG. 4 shows a single heat source 58 centrally located on the axis of the liquefaction zone but it should be understood that a plurality of heat sources could be provided with oblique orientations.

Figure 5:
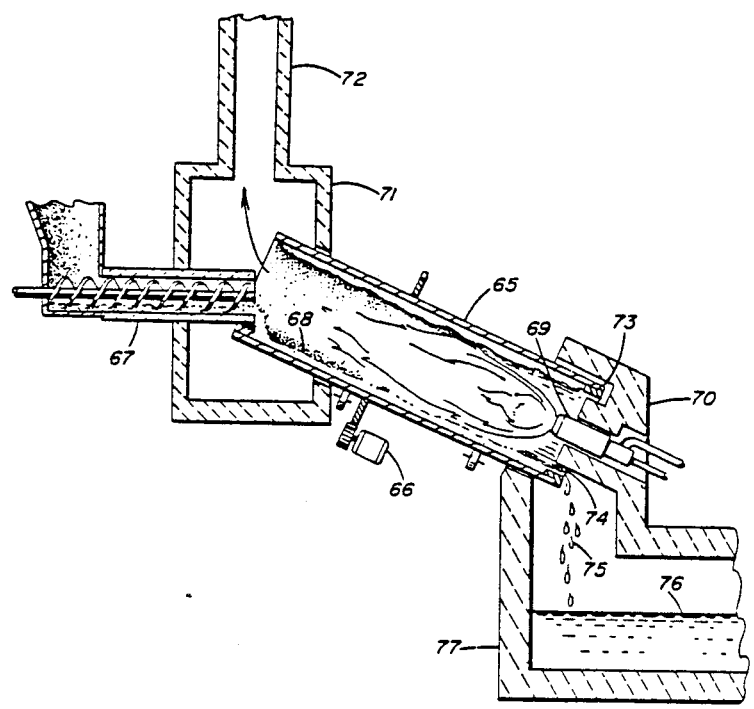
FIG. 5 is a vertical cross-section of a fifth embodiment of the present invention wherein an inclined rotary kiln provides a cylindrical batch surface.

Referring now to FIG. 5, there is shown an embodiment featuring a rotary liquefaction zone. High thermal efficiency is provided by encircling the heat source with the batch material being melted, and the transient batch layer being melted is distributed within the vessel by means of its rotation. The rotating vessel comprises an inclined steel cylinder 65 which may be rotated by way of a motor 66. Loose glass batch may be fed to the upper open end of the cylinder by means of a screw feeder 67. Before the vessel is heated, an insulating layer of batch 68 is built up within the vessel. During operating, the rate of feeding the batch and the rate of heating are balanced against one another so that the layer 68 remains stable and serves as the surface upon which newly fed batch is melted and runs toward the lower end of the cylinder. A radiant heat source such as a combustion burner 69 may be oriented along the axis of the cylinder from either end of the cylinder. As shown in FIG. 5, the burner 69 is mounted in a refractory housing 70 which closes the lower end of the cylinder 65. The combustion gases pass axially through the cylinder and escape through the upper end into an exhaust box 71 which encompasses the upper end of the cylinder. Exhaust gases may be passed from the box 71 to a stack 72. The lower end of the rotating cylinder may be provided with a refractory ceramic bushing 73 suitable for molten glass contact. A gap 74 between the burner housing 70 and the bottom inside edge of the cylinder is provided for escape of the liquefied batch 75 which may fall into a collecting pool 76 contained by a chamber 77 where the molten material may be subjected to subsequent processing. The angle of incline of the rotating cylinder will be determined by the rate at which it is desired for the liquefied batch to run out of the cylinder. The cylinder should rotate at a speed at which loose batch is held against the inside walls by centrifugal force. The minimum speed will depend upon the effective diameter of the cylinder. The following are calculated estimates:

| Diameter | Revolutions per Minute |
| --- | --- |
| 0.5 Meters | 60 |
| 1.0 Meters | 43 |
| 2.0 Meters | 37 |

Figure 6:
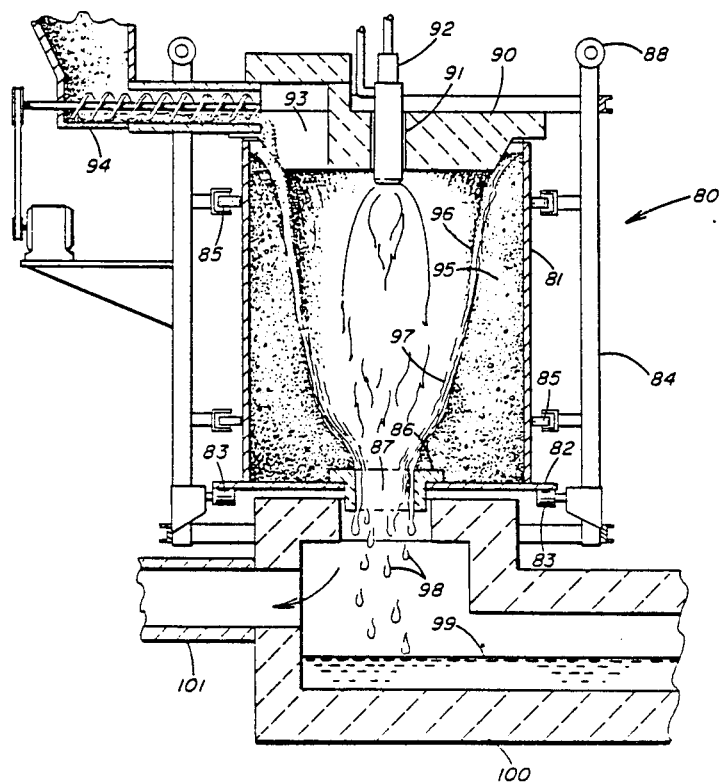
FIG. 6 is a vertical cross-section of a preferred embodiment of the present invention wherein a drum rotating about a vertical axis of rotation provides a batch surface which is a paraboloid surface of rotation about a heat source.

The preferred embodiment is shown in FIG. 6 and is characterized by a liquefaction chamber rotating about the vertical axis, with glass batch encircling a central heat source. The rotary melter 80 of this embodiment includes a housing comprising a steel cylinder 81 and a steel floor 82. The housing is provided with vertical support by a plurality of rollers 83 which are affixed to a frame 84. A plurality of side rollers 85 maintain alignment of the housing. Rotation of the housing may be provided, for example, by driving one of the roller 83 or 85 by motor means (not shown). A central opening in the floor 82 is provided with a refractory ceramic bushing 86 suitable for molten glass contact and having a central opening 87. Any suitable structure may be provided for supporting frame 84 but for purposes to be described hereinafter, it is preferred to make the entire liquefaction structure 80 relatively portable. Therefore, overhead hoist means may engage attachment means 88 affixed to upper portions of the frame 84. The upper end of the vessel may be closed by a refractory lid 90 which may be stationary and supported by the frame. The lid 90 is provided with a central bore 91 through which a burner 92 or other radiant heating means may be inserted. Alternatively, a plurality of heat sources may be employed. The lid is also provided with a feed opening 93 whereby batch may be fed from a screw feeder 94 or the like to the interior of the vessel. Before the vessel is heated, a stable layer of batch 95 is provided in the vessel by feeding loose batch while the housing is rotated. The loose batch assumes a generally paraboloid contour as shown in FIG. 6. The shape assumed by loose, dry batch is related to the speed of rotation as follows:

$$H = \mu R + (2\pi^2 \omega^2 R^2)/g$$

Where:

H = the elevation of a point on the batch surface in the direction parallel to the axis of rotation;
R = the radial distance of that point from the axis of rotation;
$\mu$ = a friction factor;
$\omega$ = angular velocity; and
g = the acceleration of gravity.

The friction factor may be taken as the tangent of the angle of repose, which for dry glass batch is typically about 35°. The above equation may be employed to select suitable dimensions for the rotary vessel at a selected speed of rotation or, conversely, for determining a suitable speed of rotation for a given vessel. The relationship shows that steeper slopes, which are generally preferred, require faster rotational speeds, and that at zero velocity, the slope is determined solely by the angle of repose as in the FIG. 4 embodiment (assuming no preforming of the batch layer).

During heating, continuous feeding of batch to the vessel of FIG. 6 results in a falling stream of batch 96 that becomes distributed over the surface of the stable batch layer, and by the action of the heat becomes liquefied in a transient layer 97 that runs to the bottom of the vessel and passes through opening 87. The liquefied batch falls as globules 98 from the exit opening and may be collected in a pool 99 within a vessel 100 for further processing. Exhaust gases from the combustion within the liquefaction vessel may also pass through the opening 87 and may be exhausted through a flue 101. Alternatively, an exhaust opening may be provided through the lid 90.

Figure 7:
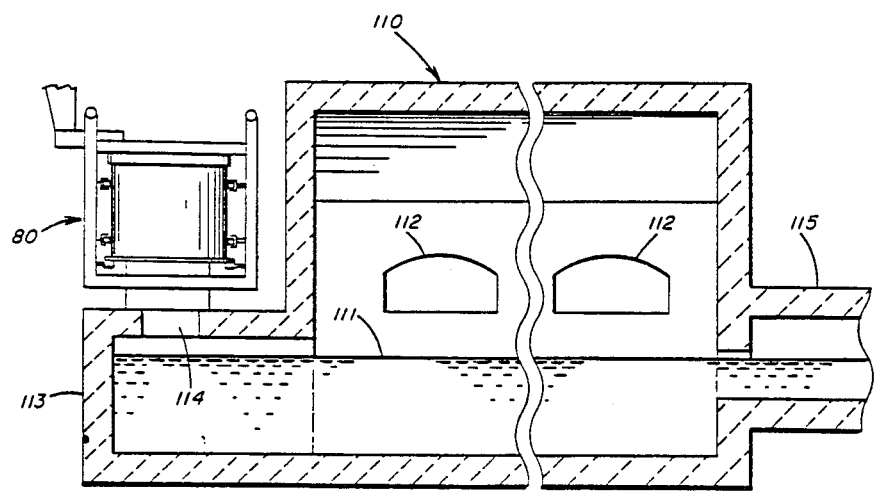
FIG. 7 is a vertical cross-section of a schematic representation of a combustion melting furnace adapted to cooperate with the batch liquifier of the embodiment of FIG. 6.
Figure 8:
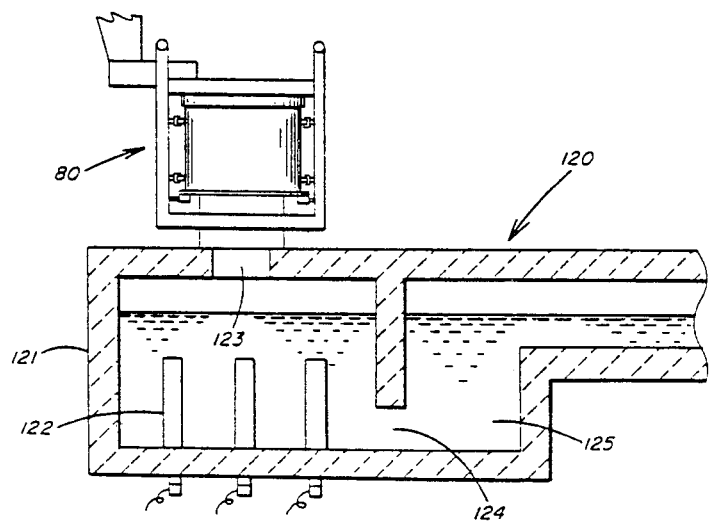
FIG. 8 is a vertical cross-section of a schematic representation of an electric melting furnace adapted to cooperate with the batch liquefier of the embodbaent of FIG. 6.

In FIGS. 7 and 8, there are depicted combinations of the rotary melter 80 of the FIG. 6 embodiments combined with conventional means for completing the melting of the liquefied batch. In order to melt residual sand grains and to refine the liquefied batch emanating from the rotary melter 80, an overhead fired furnace 110 of conventional construction may be provided as shown in FIG. 7. The furnace contains a pool of the melt 111 and may be provided with one or more side ports 112 or an end port, as are well known in the art, from which flames may be directed above the melt for providing heat thereto. The furnace may include a conventional inlet extension portion 113, but rather than feeding batch at such a location, the output from one or more batch liquefiers may be fed to the furnace through an opening 114. Melted and refined glass may pass from the furnace to a forming operation by way of a conditioner or forehearth 115. The function of the furnace 110 is primarily to raise the temperature of the melt and to provide sufficient residence time for any residual sand grains to dissolve and for gaseous inclusions to evolve from the melt. These functions represent a minor portion of those carried out in a conventional melting furnace, and therefore the furnace 110 may be only a fraction of the size of a conventional furnace having the same throughput. In other words, it is estimated that the batch liquefaction means of the present invention may replace one-half to two-thirds of a conventional flat glass melting furnace with commensurate savings in construction costs and with more efficient energy usage. A single liquefaction vessel may be used to provide liquefied batch to the furnace of a large scale, commercial glass-making operation, but it is generally more economical to provide a plurality of smaller units. Thus, to supply a throughput on the order of several hundred tons per day, it may be preferred to employ about three or four liquefaction units. It is preferred that each liquefaction unit be made portable so that a unit in need of maintenance may be removed and a reserve unit inserted in its place, thereby minimizing disruption of the glass-making operation. The use of a plurality of liquefaction units also provides an economical means for varying the throughput of the glass-making operation by increasing or decreasing the number of units in operation.

FIG. 8 illustrates another arrangement for completing the melting and refining of the output from one or more rotary liquefaction units 80, employing electric heat rather than overhead combustion firing. The electric melter 120 may be comprised of a refractory vessel 121 into which are inserted a plurality of electrodes 122 by which thermal energy is imparted to the melt by means of Joule resistance heating. The liquefied batch from a liquefaction unit or units may enter the electric melter through an opening 123. Following elevation of the melt temperature by the electric heating, a stream of the melt may pass through a submerged throat 124 to a refining zone 125 where gaseous inclusions are permitted to escape from the melt. It should be understood that in the arrangements shown in FIGS. 7 and 8, the rotary liquefaction unit 80 is illustrated as the preferred embodiment, but that the other liquefaction units disclosed herein may be used in place thereof.

In a typical glass batch formula consisting primarily of sand, soda ash and limestone, the soda ash begins to melt first, followed by the limestone, and finally the sand. Physical melting is accompanied by chemical interactions, in particular, the molten alkalis attack the sand grains to effect their dissolution at a temperature below the melting point of silica. At some intermediate point in this process, the liquid phase of the heterogeneous mixture of reacting and melting materials begins to predominate and the material becomes flowable as a fluid. The temperature at which the batch becomes flowable will depend upon the particular batch formula, especially the amount and melting temperature of the lowest melting temperature ingredients. The most common low temperature melting ingredient is soda ash, which melts at 1564° F. (851° C.). Theoretically, a batch having a sufficient amount of soda ash may become liquefied at the soda ash melting temperature, but experience with commercial batch formulas indicates that the temperature is somewhat higher —2000° F. (1090° C.) to 2100 ° F. (1150 ° C.) for a typical flat glass batch. This may be explained by the fact that batch melting is a complex series of interactions among the various ingredients, whereby the physical properties of the individual ingredients are not exhibited. It may also be that insufficient soda ash is present when melted to entrain by itself the remainder of the unmelted materials. Moreover, even though the present invention eliminates much of the overheating of conventional melters, the runoff temperatures observed with the present invention may not truly represent the initiation of liquefaction, but may include a small amount of heating after liquefaction. Other low temperature melting ingredients sometimes employed in glass batches, such as caustic soda and boric acid, have even lower melting temperatures than soda ash and may behave differently as runoff initiators. On the other hand, some types of glass other than flat glass require higher temperatures to melt. It is preferred to use the present invention with batch formulas that liquefy below 3000° F. (1650° C.). For many types of glasses made on a large scale commercially, the present invention would be expected to operate satisfactorily with liquefied batch draining from the liquefaction chamber at about 1600° F. (870° C.) to 2300° F. (1260° C).

In the present invention, the liquefied batch drains from the liquefaction zone as soon as it reaches the fluid state, and therefore the fluid draining from the liquefaction zone has a nearly uniform temperature close to the liquefying temperature of the particular batch formula, typically about 2100° F. (1150° C.) in the case of conventional flat glass. Because heat is transported out of the liquefaction zone at the liquefying temperature, which is considerably lower than the temperatures attained in a conventional glass melter, the temperature of the liquefaction vessel may be maintained relatively low regardless of the temperature of the heat source. As a result, materials requirements may be reduced relative to a conventional melter, and use of high temperature heat sources is made possible. The greater heat flux afforded by high temperature heat sources advantageously increases the rate of throughput. An example of a high temperature heat source is a combustion burner supplied with oxygen as a partial or total replacement for combustion air. The use of oxygen is also advantageous in the present invention for the sake of reducing the volume of combustion gases, thereby decreasing any tendency of the final batch materials to become entrained in the exhaust gas stream. This is particularly significant in the preferred practice of feeding the batch dry to the liquefaction vessel as opposed to the conventional practice of wetting the batch with water to inhibit dusting. Furthermore, the use of oxygen instead of air is believed to reduce the potentiality for creating nitrogen containing bubbles in the glass.

An example of a batch formula employed in the commercial manufacture of flat glass is the following:

| Sand | 1000 | parts by weight |
|---|---|---|
| Soda ash | 313.5 | |
| Limestone | 84 | |
| Dolomite | 242 | |
| Rouge | 0.75 | |

The above batch formula yields approximately the following glass:

| $SiO_2$ | 73.10% | by weight |
|---|---|---|
| $Na_2O$ | 13.75% | |
| CaO | 8.85% | |
| MgO | 3.85% | |
| $Al_2O_3$ | 0.10% | |
| $Fe_2O_3$ | 0.10% | |

The liquefied batch running out of the liquefaction zone of the present invention, when using the batch formula set forth above, is predominantly liquid (weight basis) and includes about 15% by weight or less of crystalling silica (i.e., undissolved sand grains). The liquid phase is predominantly sodium disilicate and includes almost the entire soda ash portion of the batch and most of the limestone and dolomite. The fluid, however, is quite foamy, having a density typically on the order of about 1.9 grams per cubic centimeter, as opposed to a density of about 2.5 grams per cubic centimeter for molten glass.

Although additional energy must be imparted to the liquid to convert it to a completely melted glass, it is estimated that a major portion of the overall energy consumption is spent in the batch liquefaction process, and that that portion of the process is carried out substantially more efficiently by the liquefaction methods of the present invention compared to a conventional tank-type melter. A theoretically derived value for the total energy required to completely melt glass is 2.5 million BTU's per ton (0.7 million kcal/metric ton) of glass produced. In order to complete the melting of the material leaving the liquefaction zone of the present invention, it is calculated that theoretically 0.36 million BTU's per ton (0.1 million kcal/metric ton) would be required, or about 14% of the total theoretical energy requirement. In a conventional overhead fired tank melting furnace operating at state-of-the-art efficiency, total energy consumption has been found to be typically about 6.25 million BTU's per ton (1.75 million kcal/metric ton) of glass produced. The liquefaction process of the present invention, on the other hand, has been found to consume, typically, about 4.5 million BTU's per ton (1.26 million kcal/metric ton). Accordingly, it can be seen that the liquefaction step performed in accordance with the present invention accomplishes about 86% of the melting while consuming about 72% of the energy required by a conventional melter. The total energy efficiency of the present invention will depend upon the efficiency of the particular process employed to complete the melting of the liquefied batch, but if the efficiency of the subsequent stage is no better than the efficiency of a conventional tank-type melter, it can be estimated that the overall energy consumption for melting glass in accordance with the present invention would be about 5.4 million BTU's per ton (1.5 million kcal/metric ton), or about 86% of the amount of energy used in the conventional melting process. In fact, it is contemplated that the energy efficiency of subsequent processing steps employed in conjunction with the batch liquefaction of the present invention would be better than that of the conventional melting process, since conditions may be provided that are particularly adapted to the specific tasks of melting residual sand grains and removing gaseous inclusions from the melt. Furthermore, the energy consumption figures employed above for the conventional melting process include heat recovery from the exhaust gases, whereas the figures for the liquefaction process of the present invention do not. Therefore, employing conventional heat recovery means with the process of the present invention may be expected to lower its energy requirements further.

A pilot scale trial of the embodiment of FIG. 6 employed a steel cylindrical drum 18 inches (46 centimeters) high and having an inside diameter of 25.25 inches (64 centimeters). Optimum rotation of the drum was found to be in the range of 42 to 48 revolutions per minute in order to form a stable layer of loose batch covering the inside wall of the drum. The bottom exit opening has an 8 inch (20 centimeter) diameter. The burner was fired with natural gas and oxygen in stoichiometric ratio and expended 4.3 million BTU's per ton (1.2 million kcal/metric ton) of liquefied batch produced. The maximum production rate attained was 2.8 tons per day of liquefied batch.

Figure 9:
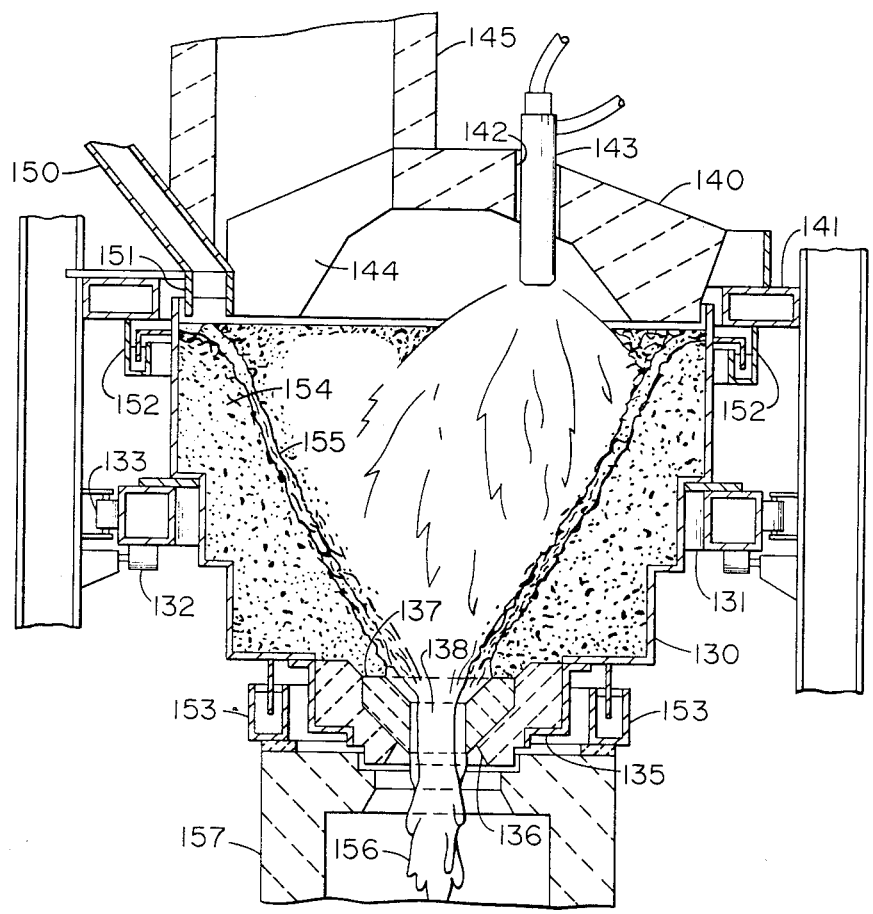
FIG. 9 is a vertical cross-section of a preferred variation on the type of embodiment shown in FIG. 6.

FIG. 9 shows an improved version of the vertical axis rotating drum embodiment of FIG. 6. In the FIG. 9 version a drum 130 has stepped sides so as to decrease the amount of mass being rotated. The drum could, of course, be a conical shape as in FIG. 4, but the stepped construction is preferred for ease of fabrication. The drum 130 is supported on a circular frame 131 which is, in turn, mounted for rotation about a generally vertical axis corresponding to the center line of the drum on a plurality of support rollers 132 and aligning rollers 133. A bottom section 135 houses an outlet assembly which may be detached from the remainder of the drum. The housing 135 may be lined with an annulus of refractory material 136 such as castable refractory cement in which is seated a ring-like bushing 137 of erosion resistant refractory. The bushing 137 may be comprised of a plurality of cut pieces of ceramic. An open center 138 in the bushing 137 comprises the outlet opening from the liquefaction chamber. An upwardly domed refractory lid 140 is provided with stationary support by way of a circular frame member 141. The lid includes an opening 142 for insertion of a burner 14. In this embodiment the exhaust gases escape upwardly through an opening 144 through the lid 140 and into an exhaust duct 145. The opening 144 may also be utilized for feeding the raw materials to the liquefaction chamber and in the FIG. 9 embodiment, a feed chute 150 is provided for this purpose. The bottom end of the feed chute 150 may be provided with a movable baffle 151 for the purpose of controlling the location at which the raw materials are deposited into the liquefaction chamber. Upper and lower water seals 152 and 153 respectively, may be provided to isolate the interior of the liquefaction chamber from the exterior ambient conditions and to trap any dust or vapors that may escape from the vessel. As in the previous embodiments, a stable layer of unmelted material 154 is maintained within the liquefaction chamber and on this stable layer a transient layer 155 melts and flows downwardly through the bushing outlet 138. The liquefied material 156 then falls into a collection vessel 157.

Although the description of the invention heretofore has related specifically to liquefying glass batch, it should be apparent that the principles of the invention may apply to other materials as well, particularly materials that are initially in a flowable solid form (i.e., granular or pulverulent) and are thermally meltable to a flowable fluid state. Flowability is a desirable characteristic of the feed material for the sake of distributing the material onto the melting surface within the liquefaction chamber. Typically the feed will chiefly comprise subdivided solids, but may include a liquid portion. It is also within the scope of the invention to feed a plurality of streams into the liquefaction chamber, some of which may be liquids. In general, the combined feed for use in the present invention may be characterized as having a greater frictional resistance to flow down the surface of the stable layer than does the liquefied material. Thus, the material initially remains exposed to the heat until it becomes liquefied, whereupon it flows out of the liquefaction zone. Combinations of properties analogous to those in the liquefaction of glass batch may be found in the fusing of ceramic materials and the like and in metallurgical smelting type operations.

Whatever material is being processed, the vessel of the embodiment of FIG. 4, 5 or 6 is insulated from the interior heat by a substantially stable layer of material maintained on the interior of the vessel. It is desirable for the thermal conductivity of the material employed as the stable layer to be relatively low so that practical thicknesses of the layer may be employed while avoiding the need for wasteful forced cooling of the vessel exterior. In general, granular or pulverulent mineral source raw materials provide good thermal insulation, but in some cases it may be possible to use an intermediate or product of the melting process as a non-contaminating stable layer. For example, in a glass-making process, pulverized cullet (scrap glass) could constitute the stable layer, although a thicker layer would be required due to the higher thermal conductivity of glass as compared to glass batch. In metallurgical processes, on the other hand, using a metallic product as the stable layer would entail unduly large thicknesses to provide thermal protection to the vessel, but some ore materials may be satisfactory as insulating layers.

In commercial glass-making operations, glass batches often include substantial amounts of cullet, or scrap glass. The present invention can accommodate conventional cullet-containing batches, and could be used to melt cullet alone. The cullet may be mixed with the other batch constituents prior to feeding, or the cullet may be fed into the liquefaction zone as a separate stream.

An advantage of the present invention is that it can accommodate dry, loose batch materials, thereby avoiding the necessity to agglomerate the batch materials if it is desired to preheat the batch materials. It should be apparent, however, that the use of agglomerated batch is not precluded by the present invention. Thus the feed to the liquefaction vessel may comprise pellets, biquettes, granules, pre-melted marbles, or other agglomerated forms.

A feature of the invention is that melting takes place in a transient layer that is supported by and flows on a stable layer. It should be understood that the terms "transient" and "stable" are relative, and that a distinct physical demarcation between the transient and stable layers may not always be identifiable. The use of the terms "transient" and "stable" is not intended to preclude the possibility that minor fluctuation of the interface therebetween may occur. The basic distinction is that the region that is described as the transient layer is characterized by melting and flowing, whereas the region termed the stable layer, in at least its major portion, does not participate in the melting and flowing of the throughput stream. Although the transient layer is said to be "on" the stable layer, one might theoretically define an intermediate layer therebetween, and it should be understood that that possibility is intended to be included. For example, it would be within the ambit of the invention as expressed to feed a plurality of constituents in a stratified manner onto the melting surface.

In the preferred embodiments, the stable layer is preferably of essentially the same composition as the material being processed. However, it should be understood that precursor or derivative materials would be considered "essentially the same composition" in this context. In other words, the stable layer could be the raw material, the product material, an intermediate, or a different form or mixture thereof, as long as it melts or reacts to form a substance that does not introduce significant amounts of foreign constituents into the throughput stream. It should also be evident that this compositional requirement of the stable layer need apply only to surface portions that actually contact the throughput stream and to portions just under the surface that may occasionally erode into the throughput stream. Therefore, an equivalent arrangement might employ a different material in portions of the stable layer below the level at which erosion is likely to occur. Since this subsurface portion serves primarily as insulation to protect the vessel, it could be composed of a material selected for its thermal insulating properties (e.g., sand or ceramic particles), although it should be sufficiently compatible compositionally to not contaminate the surface layer at the temperatures involved.

Of course, a compositional variation of the throughput material caused by contact with the lining which is within the limits of toleration for the quality requirements of the particular product being made would not be considered contaminating. The compositional control requirements for bottle glass or fiber glass are not as high as for flat glass or optical glass, and therefore could tolerate greater compositional differences between the throughput material and the lining without being considered contaminating. For example, boron (usually expressed as $B_2O_3$) is often included in fiber glass compositions and is useful in the melting process, but stringent control of the $B_2O_3$ content of the final product is not always necessary. Therefore, liquefying fiber glass batch containing $B_2O_3$ would be consistent with the principles of the present invention.

A common fiber glass composition is the "E glass" type, having the following composition (in weight percent):

| | |
|---|---|
| $SiO_2$ | 52–55% |
| $Al_2O_3$ | 14–15 |
| $B_2O_3$ | 7–10 |
| MgO | 0–5 |
| CaO | 17–22 |
| $Na_2O$ | 0.3–0.5 |
| $K_2O$ | 0.1–0.9 |
| $Fe_2O_3$ | 0–0.4 |
| $F_2$ | 0–0.6 |

The batch source of boron is usually colemanite or boric acid.

Also, it should be apparent that a compositional difference between the lining and the material being liquefied that consists of a component that is volatilized or otherwise substantially eliminated from the liquefied material by the melting process or other subsequent treatments would not be considered contaminating. For example, it is well known to include in glass batch formulas refining aids such as sulfur, fluorine, antimony, or arsenic. The presence of these refining aids during melting is considered useful, but they are sometimes largely volatilized and their concentration, if any, in the final glass product is usually not critical. Therefore, in many cases, it would be acceptable for the lining to be free of such a refining aid that may be present in the throughput material. In another example, when the liquefaction process of the present invention is employed as part of an ore smelting operation, the liquefaction step would be followed by a purification process in which the metal is separated from the slag. In such a case, erosion of minor amounts of a lining of a substantially different composition (e.g., sand) into the liquefied ore would not be objectionable since the liquefied ore would be subsequently purified. In a similar example, silica is produced by melting a sodium silicate glass, dissolving the glass in water, and then precipitating silica. In such a process the initial melting step may be performed by the process of the present invention with a pulverulent lining (e.g., sand) somewhat different in composition from that of the batch feed material, since entrained, unmelted particles of the lining can be settled from the solution after the dissolving step. In another well-known process, certain glass compositions are phase separated and leached to produce high silica products. When liquefying such a glass by the process of the present invention, any constituent that is contributed by the lining to the phase that becomes leached would, of course, not be considered contaminating.

In those situations where contamination of the throughput material is not of primary concern, the present invention offers an advantage in its use of a pulverulent lining in the liquefaction vessel. Whereas a solid refractory lining is subject to cracking, spalling, and displacement, a pulverulent lining is not. Installing a solid refractory lining entails careful, time-consuming shaping and placement of a plurality of pieces, but the pulverulent lining of the present invention is formed simply by pouring the material into the vessel. In time, a refractory lining will erode and require replacement, necessitating a complete shut-down of the process for re-lining. In the present invention, on the other hand, the pulverulent lining repairs itself during use by means of batch material, or if re-lining with a material other than the batch material is desired, by a brief interruption of the continuity of the process while a charge of the lining material is fed to the vessel. The pulverulent lining also provides more flexibility in a periodically operated process in that it does not require the slow heat-up and cool-down periods entailed by a solid refractory lining.

Other modifications and variations as would be obvious to those of skill in the art may be resorted to without departing from the scope of the invention as defined by the claims which follow.

We claim:

1. A method of liquefying a thermally meltable material to produce a molten product comprising:
   insulating an interior side wall portion of a vessel encircling a central cavity with a lining of pulverulent material differing from the composition of the material being liquefied by a constituent whose presence is not essential to the final product;
   feeding pulverulent material to be liquefied onto an upper inlet portion of the lining;
   heating the cavity to partially liquefy the meltable material so that the partially liquefied material flows over the lining and flows freely to a lower outlet where it is drained from the vessel; and
   balancing the rate of heating and the rate of feeding additional material onto the lining so as to maintain a stable thickness of the lining sufficient to protect the vessel from undue thermal deterioration.

2. The method of claim 1 wherein at least surface portions of the lining comprise glass constituents, and the material fed into the vessel is glass batch having a higher boron content than the surface portions of the lining.

3. The method of claim 1 wherein at least surface portions of the lining comprise glass constituents, and the material fed into the vessel is glass batch having a higher content than the lining of a melting aid selected from the group consisting of sulfur, fluorine, antimony, and arsenic.

4. The method of claim 1 wherein, upon reduction of the lining thickness due to erosion, feeding of the pulverulent meltable material is ceased, pulverulent lining material different in composition from the meltable material is fed onto the lining so as to increase its thickness; and upon increasing the lining thickness, ceasing feeding of the lining material and resuming feeding of the pulverulent meltable material.

5. A method of liquefying a thermally meltable material to produce a molten product comprising:
   insulating an interior side wall portion of a vessel encircling a central cavity with a lining of pulverulent material of a first composition;
   feeding pulverulent material of a second composition different from the first composition onto an upper inlet portion of the lining;
   heating the cavity to partially liquefy the meltable material of the second composition so that partially liquefied material flows over the lining and flows freely to a lower outlet where it is drained from the vessel;
   balancing the rate of heating and the rate of feeding additional material onto the lining so as to maintain a stable thickness of the lining sufficient to protect the vessel from undue thermal deterioration; and
   subsequently altering the composition of the material drained from the vessel so as to correct compositional deviations caused by the difference between the first and second compositions.

6. The method of claim 5 wherein the compositional altering step includes extracting a constituent from the drained material.

7. The method of claim 6 wherein the extraction step includes partially dissolving the drained material in a solvent in which the constituent to be extracted is less soluble, separating undissolved material from the solute, and processing the solute to form a product.

8. The method of claim 7 wherein the drained material comprises sodium silicate glass and the solvent is water.

9. The method of claim 6 wherein the extraction step includes leaching the constituent to be extracted in a solvent in which the product material is substantially insoluble.

10. The method of claim 6 wherein the extraction step includes a phase separation process.

11. The method of claim 6 wherein the liquefied material is metallurgical ore and the extraction step includes smelting the ore and separating a metallic portion from a slag portion.

12. The method of claim 11 wherein the lining comprises sand.

13. The method of claim 6 wherein the extracting step includes volatilizing a constituent from the drained material.

14. The method of claim 13 wherein the drained material comprises glass, and the constituent volatilized is selected from the group consisting of sulfur, fluorine, and boron.

15. The method of claim 5 wherein the composition altering step includes adding a constituent to the drained material.

16. The method of claim 5 wherein, upon reduction of the lining thickness due to erosion, feeding of the second composition is ceased and pulverulent material of the first composition is fed onto the lining so as to increase the lining thickness, and upon increasing the lining thickness feeding of the first composition is ceased and feeding of the second composition is resumed.

* * * * *